Patented Aug. 28, 1951

2,565,529

UNITED STATES PATENT OFFICE 2,565,529

CONJUGATED ALDEHYDE-SECONDARY AMINE REACTION PRODUCTS

Curtis W. Smith, Berkeley, Calif., assignor to Shell Development Company, San Francisco, Calif., a corporation of Delaware No Drawing. Application October 18, 1946, Serial No. 704,291

8 Claims. (Cl. 260—583)

This invention relates to certain unsaturated diamines and to a method for their preparation. More particularly, the present invention relates to a class of compounds in the propene-1,3-diamine series of compounds, and to a process of preparing the same from alpha,beta-unsaturated aldehydes and unsaturated allylic amines.

The compounds provided by the present invention are, in general, characterized by containing in their structure the unit represented by the structural formula

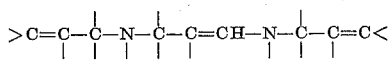

wherein the two nitrogen atoms are tertiary in character. Because of their highly unsaturated character and the spatial arrangement of the points of unsaturation relative to both the entire configuration of the molecule and the two tertiary nitrogen atoms, the compounds of this class possess unique and advantageous properties that render them distinctive from compounds heretofore known, and of correspondingly improved utility in the arts.

In a preferred embodiment of the present invention, the compounds conforming to the foregoing structural formula are acyclic and have attached to the free valencies shown in the formula either hydrogen atoms or separate lower alkyl or lower alkenyl radicals, the nitrogen atoms, however, being tertiary in character as in the more general case. For the purposes of the present invention, a lower alkyl or lower alkenyl radical may be defined as an alkyl or alkenyl radical, respectively, containing not over six carbon atoms. The compounds thus falling within this preferred class of compounds of the present invention are of particular utility as intermediates for the preparation of a wide variety of chemical compounds, as by substitutive or additive reaction at the olefinic bonds or elsewhere in the molecule, by reaction at one or both of the nitrogen atoms, by reactions leading to fission of the molecule, etc. The compounds thus represented by the preferred class also find particular utility as raw materials for the preparation of compounds useful as flotation agents in separation processes involving flotation techniques, as wetting agents, as emulsifiers, and in similar applications wherein such derived organic bases advantageously may be employed. Because of their unsaturated character, modification of the properties of the present compounds are readily accomplished, for example, by addition of appropriate radicals or atoms at the olefinic bonds, thereby providing a highly desirable latitude in specific characteristics that may be obtained.

The advantageous characteristics of compounds provided by the present invention are not limited to this preferred class of compounds, however. Useful and valuable materials are provided, for example, when at least one of the free valencies of the foregoing structural formula is satisfied by a cyclic group such as an aryl, alkaryl, or aralkyl group or a cycloaliphatic or heterocyclic radical. The invention also comprises in its broader aspects the advantageous compounds wherein one or both of the terminal allylic groups of the foregoing formula forms part of a cyclic structure which may or may not include the adjacent nitrogen atom, such cyclic structures preferably containing either five or six atoms in the ring. For example, N,N'-bis(2-cyclohexenyl)-N,N'-dimethylpropene-1,3-diamine and 1,3-bis($\Delta^3$-tetrahydropyridino)propene.

A further, more limited class of valuable compounds provided by the present invention is the class consisting of the acyclic N,N,N',N'-tetraalkenylpropene-1,3-diamines corresponding to the above formula and represented, for example, by the N,N,N',N'-tetraalkenylpropene-1,3-diamines such as N,N,N',N'-tetraallylpropene-1,3-diamine, N,N,N',N'-tetrakis(2-methylallyl)propene-1,3-diamine, N,N,N',N'-tetracrotylpropene-1,3-diamine, N,N'-diallyl-N,N'-bis(3-butenyl)propene-1,3-diamine, N,N,N',N'-tetraallyl-2-methylpropene-1,3-diamine and similar propene-1,3-diamines wherein all of the groups attached to each of the nitrogen atoms are olefinic in character. Such compounds may be represented in general as containing in their structure the unit represented by the structural formula given above, in the compounds the free valencies of the nitrogen atoms in the structural formula being satisfied by alkenyl groups bonded thereby, such as allyl, methallyl, crotyl, butenyl, propenyl, hexenyl, and similar straight chain or branched chain alkenyl radicals. Because of their degree and character of unsaturation, the diamines of this more limited class possess characteristics of particular value in numerous applications, especially in the synthesis of derived compounds and the like.

It will be appreciated that in general the free valencies of the carbon atoms not adjacent to nitrogen atoms in the foregoing structural unit may be satisfied by substituent groups such as, halogen, nitro carbonitrile, carbalkoxy, sulfone, and similar groups which do not impart undesirable instability to the molecule as a whole. Preferably, however, the compounds prepared according to the present invention have only hydrogen or hydrocarbyl groups attached to the carbon atoms of the foregoing structural unit.

Representative compounds provided by the present invention include, for example:

N,N,N',N' - tetrakis(2 - methylallyl)propene-1,3-diamine

N,N,N',N'-tetraallylpropene-1,3-diamine

N,N,N',N', - tetraallyl - 2 - methylpropene - 1,3-diamine

N,N,N',N' - tetrakis(2 - methylallyl) - 3 - methly-1-propene-1,3-diamine

N,N,N',N' - tetracrotyl - 3 - methyl - 1 - propene-1,3-diamine

N,N' - diallyl - N,N' - diethylpropene - 1,3-diamine

N,N' - dicrotyl - N,N' - dipropyl - 2 - butylpropene - 1,3 - diamine

N,N' - diallyl - N,N' - diphenyl - 3 - methyl - 1-propene - 1,3 - diamine

N,N' - diallyl - N,N' - dicrotylpropene - 1,3 - diamine

N,N,N',N' - tetraallyl - 2 - chloropropene - 1,3-diamine

N,N' - diallyl - N,N' - dibutyl - 2 - phenylpropene-1,3 - diamine

N,N,N',N' - tetrakis(2 - methylallyl) - 2 - methylpropene - 1,3 - diamine

N,N' - diallyl - N,N' - dicyclohexyl - 2 - ethylpropene - 1,3 - diamine

N,N' - diallyl - N - ethyl - N' - methyl - propene-1,3 - diamine

N,N,N',N' - tetrakis(2 - chloroallyl)propene - 1,3-diamine

N,N,N',N', - tetrakis(2 - chloroallyl) - 2 - methylpropene - 1,3 - diamine and similar compounds. Because of the ready availability of the necessary starting materials as well as the particularly advantageous properties of the compounds, the present invention is most favorably exemplified by the propene - 1,3-diamines: N,N,N',N' - tetraallyl - propene - 1,3-diamine, N,N,N',N' - tetrakis(2 - methylallyl) - propene - 1,3 - diamine, and N,N,N',N'-tetraallyl-2 - methyl - propene - 1,3 - diamine.

The compounds of the present invention are non-resinous, generally liquid products that range in color from substantially colorless materials to yellowish or brownish-yellow substances. As indicated previously, the character and degree of their unsaturation renders them valuable diamine bases having utility in various fields. The compounds of the present invention find additional utility, possibly due also to their basic and unsaturated characteristics, as, in certain cases, insecticides and other antibiotics, as vulcanization activators in the vulcanization of natural and synthetic rubbers, as additives to lubricating oils and greases to provide desirable modifications in the properties thereof, and in similar applications.

In accordance with the process of the present invention, the novel compounds herein provided may, in general, be prepared advantageously by reaction between an appropriate alpha,beta-unsaturated aldehyde and one or more secondary monoamines having attached to the nitrogen atom at least one alkenyl group with an olefinic bond in the 2,3-position relative to the nitrogen atom. The particular alpha,beta-unsaturated aldehyde and secondary amine to be employed depend upon the compound that it is desired to prepare, and therefore will be selected accordingly. In general, the reaction involved in the preparation of the herein described compounds from the stated unsaturated aldehydes and secondary monoamines appears to be as represented by the following equation:

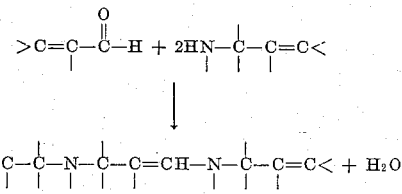

For example, in the preparation of the preferred species of compounds of the present invention there are employed secondary amines and alpha,-beta-unsaturated aldehydes as follows:

*Table I*

| Secondary Amine | Unsaturated Aldehyde | Diamine Formed |
| --- | --- | --- |
| diallylamine | acrolein | N,N,N',N'-tetraallylpropene-1,3-diamine. |
| dimethallylamine | do | N,N,N',N'-tetrakis(2-methylallyl)propene-1,3-diamine. |
| diallylamine | methacrolein | N,N,N',N'-tetraallyl-2-methyl-propene-1,3-diamine. |

Other representative secondary amines and alpha,beta-unsaturated aldehydes which may be employed for preparation of the indicated diamines are as follows:

*Table II*

| Secondary Amine | Unsaturated Aldehyde | Diamine Formed |
| --- | --- | --- |
| dicrotylamine | methacrolein | N,N,N',N'-tetracrotyl-2-methylpropene-1,3-diamine. |
| diallylamine | crotonaldehyde | N,N,N',N'-tetraallyl-3-methyl-1-propene-1,3-diamine. |
| dimethallylamine | alpha-chloroacrolein | N,N,N',N'-tetrakis(2-methylallyl)-2-chloropropene-1,3-diamine. |
| dicrotylamine | alpha-ethylacrolein | N,N,N',N'-tetracrotyl-2-ethylpropene-1,3-diamine. |
| allylethylamine | acrolein | N,N'-diallyl-N,N'-diethylpropene-1,3-diamine. |
| crotylethylamine | methacrolein | N,N'-dicrotyl-N,N'-diethyl-2-methylpropene-1,3-diamine. |

Other secondary amine and alpha,beta-unsaturated aldehyde reactants may be employed in an analogous manner for the preparation of other diamines of the class herein disclosed. If desired, mixtures of two or more amines may be employed to form mixtures of diamines that are, respectively, symmetrically and unsymmetrically substituted on the nitrogen atoms. Generally, however, it is preferred to employ only one amine, and thereby prepare the symmetrically substituted propene-1,3-diamines as the principal products of reaction.

The process of the present invention is executed by reacting an alpha,beta-unsaturated aldehyde and a secondary monoamine having attached to the nitrogen atom at least one alkenyl group and having an olefinic bond in the 2,3-position in respect to the nitrogen atom.

Reaction between the alpha,beta-unsaturated aldehyde and the secondary alkenyl amine may be effected advantageously by mixing the two reactants, or otherwise bringing them into reactive contact, desirably in the presence of an active desiccating agent and preferably in the presence of a suitable organic solvent medium, under conditions of time and temperature that promote the desired reaction but that do not promote undesirable side reactions, resinification and the like. The desiccating agent preferably is one that does not react with either the unsaturated aldehyde or the secondary amine to the detriment of the desired reaction and that does not promote undesired side reactions under the conditions employed. Non-acidic desiccating agents that are insoluble in the reaction mixture are, in general, highly satisfactory, representative examples thereof being potassium carbonate, calcium oxide, magnesium oxide, sodium sulfate, sodium carbonate, calcium sulfate, and the like. Desiccating agents relying upon physical absorption for their activity, such as activated alumina, etc. also may be employed. Any organic solvent medium that is inert under the conditions of reaction and liquid at the temperature of reaction may be employed, such as various ethers, aliphatic hydrocarbons, aromatic hydrocarbons, chlorinated aliphatic hydrocarbons, and the like. Diethyl ether, methylethyl ether, di-isopropyl ether, hexane, heptane, isooctane, benzene, ethyl chloride, propyl chloride, isopropyl chloride, and the like are, in general, highly satisfactory for use as the organic solvent medium.

The unsaturated aldehyde and secondary monoamine reactants may be employed with either one or the other in stoichiometric excess, say in proportions ranging from about 1 mole to about 3 moles of secondary monoamine per mole of unsaturated aldehyde. Generally speaking, however, most advantageous results in respect to yield of the desired products, etc., are obtained through the use of the reactants in the theoretically required proportions, i. e., about 2 moles of the secondary amine per mole of the unsaturated aldehyde.

The temperature of reaction that is employed most effectively depends to a certain extent upon the reactants employed, and the like. Temperatures not over ordinary room temperatures are preferable. At excessively low temperatures the reaction is retarded unduly and either excessively long reaction times are required or undesirably low yields result. On the other hand, at excessively high temperatures side reactions leading to products of reaction other than those desired tend to occur, reducing the yield of the desired products. In general, temperatures of from about −20° C. to about +30° C. are highly favorable, although it will be appreciated that either somewhat higher or somewhat lower temperatures may at times be employed, depending upon the reactants used, other conditions of reaction, and the like. However, temperatures in excess of about 50° C. should be substantially avoided since the use of such higher temperatures tends to promote formation of products of reaction substantially different from those desired in accordance with the present invention.

The reaction may be effected in any suitable manner, either batchwise, intermittently, or continuously. In the case of batchwise operation, one part of the unsaturated aldehyde may be dissolved in from about 0.5 to about 50 parts by weight, preferably from about 0.5 to about 5 parts by weight, of inert organic solvent medium, and sufficient desiccating agent added thereto to maintain substantially anhydrous conditions during the course of the reaction. The secondary alkenyl amine, dissolved in additional organic solvent medium, if desired, then may be added slowly to the solution of aldehyde, with agitation and while maintaining the temperature of the solution at the desired temperature of reaction. Alternatively, the amine may be dissolved in the organic solvent medium and the unsaturated aldehyde added thereto. In the case of continuous operation, streams of organic solvent solutions of the two reactants may be mixed in the desired proportions and passed over a bed of desiccating agent or through a reaction tube containing desiccating agent, and the like. Other physical means of effecting the initial reaction may be employed and will be apparent to those skilled in the art.

The time required for completion of the reaction depends upon the reactants employed, the temperature of reaction, and similar factors. In general, satisfactory completion of the reaction may be obtained in from about 2 to about 24 hours. During the later phases of the reaction, when the major portion of the reactants has reacted, the temperature may be increased, if desired, to accelerate the final stages of reaction, temperatures above about 100° C. generally being avoided, however.

After completion of the reaction, the desiccant may be separated from the reaction mixture as by filtration, and the product of reaction recovered and/or purified in any suitable manner such as by treatment with selective solvents, by distillation, and the like. A highly satisfactory mode of operation involves filtering the reaction mixture to remove solid desiccant and then removing the organic solvent medium as by evaporation or distillation under reduced pressure. Following removal of the solvent, the residue which contains the propene diamine of the herein described class, frequently along with minor amounts of unreacted unsaturated aldehydes and/or unreacted secondary alkenyl amine and possible products of side reactions, may be further purified by fractional distillation under reduced pressure. Other means of effecting purification of the reaction mixture may be employed, however, and will be apparent to the art.

The following examples, in addition to the specific reactants and reaction products referred to in Tables I and II, will illustrate certain specific embodiments of the products and the process of the present invention:

EXAMPLE I

One hundred twelve parts of acrolein were added gradually and with stirring to a solution of 388 parts of diallylamine in 300 parts of diethyl ether in which were suspended 100 parts of finely powdered anhydrous potassium carbonate, the temperature of the reaction mixture being maintained at about 10° C. After all of the acrolein had been added, the reaction mixture was maintained, with moderate agitation, at a temperature of 5° C.–10° C. for about 12 hours. The potassium carbonate then was removed by filtration and the diethyl ether was removed from the filtrate by evaporation under reduced pressure.

The residue remaining was fractionally distilled under reduced pressure, whereby N,N,N′,N′-tetraallylpropene-1,3-diamine distilling at a temperature of 97° C.–99° C. under a pressure of 0.08 millimeter mercury, was recovered in excellent yield. The 1,3-diamine was stable upon standing. It had no appreciable tendency to darken in color or to increase in viscosity during storage.

EXAMPLE II

Acrolein and di(2-methylallyl)amine were reacted in a manner similar to that employed in Example I. After removal of the desiccant and organic solvent medium, N,N,N',N'-tetrakis(2-methylallyl)propene-1,3-diamine was recovered in good yield by fractional distillation of the residue remaining.

EXAMPLE III

Methacrolein and di(2-methylallyl)amine were reacted according to the method of Example I, except that reaction was completed by a terminal reaction period of about 2 hours at the reflux temperature after the initial low temperature phase. Distillation under reduced pressure of the residue remaining after removal of desiccant and solvent led to the recovery in good yield of N,N,N',N' - tetrakis(2 - methylallyl) - 2 - methylpropene-1,3-diamine.

I claim:

1. An N,N,N',N'-substituted lower 2-alkene-1,3-diamine characterized in that each of the amino nitrogen atoms of said diamine is a tertiary amino nitrogen atom and further characterized in that each of the amino nitrogen atoms has directly linked thereto as the only substituents a lower hydrocarbon radical and a lower 2-alkenyl radical.

2. An N,N,N',N'-substituted lower 2-alkene-1,3-diamine characterized in that each of the amino nitrogen atoms of said diamine is a tertiary amino nitrogen atom and further characterized in that each of said amino nitrogen atoms has directly linked thereto as the only substituents two lower 2-alkenyl radicals.

3. N,N' - Bis(lower alkyl) - N,N' - bis(lower 2-alkenyl)propene-1,3-diamine.

4. N,N,N',N' - Tetrakis(lower 2 - alkenyl)propene-1,3-diamine.

5. N,N,N',N' - Tetrakis(lower 2 - alkenyl) - 2 - (lower alkyl)propene-1,3-diamine.

6. N,N,N',N' - Tetrakis(2 - methylallyl)propene-1,3-diamine.

7. N,N,N',N'- Tetraallyl - 2 - methylpropene-1,3-diamine.

8. N,N,N',N' - Tetraallylpropene - 1,3 - diamine.

CURTIS W. SMITH.

REFERENCES CITED

The following references are of record in the file of this patent:

UNITED STATES PATENTS

| Number | Name | Date |
|---|---|---|
| 1,834,849 | Kropp | Dec. 1, 1931 |
| 1,834,850 | Kropp | Dec. 1, 1931 |
| 2,172,822 | Tamele | Sept. 12, 1939 |

OTHER REFERENCES

Mannich et al.: "Ber. deut. Chem.," vol. 69, pp. 2112–2123 (1936).